(12) United States Patent
Fushimi et al.

(10) Patent No.: US 6,345,023 B1
(45) Date of Patent: Feb. 5, 2002

(54) OPTICAL DISC APPARATUS WITH DIFFERENT FREQUENCIES OF WOBBLE SIGNAL AND CLOCK SIGNAL FOR ROTATION CONTROL

(75) Inventors: Tetsuya Fushimi, Hitachinaka; Toshimitsu Kaku, Sagamihara; Toshiaki Ishibashi, Yokohama; Atsushi Saito, Hino, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/291,118

(22) Filed: Apr. 14, 1999

(30) Foreign Application Priority Data

Apr. 14, 1998 (JP) .......................................... 10-102387

(51) Int. Cl.[7] ............................................... G11B 7/00
(52) U.S. Cl. ............................... 369/47.36; 369/47.48; 369/53.16
(58) Field of Search .......................... 369/47.28, 47.36, 369/47.48, 44.13, 275.3, 53.16

(56) References Cited

U.S. PATENT DOCUMENTS

| | | | | |
|---|---|---|---|---|
| 5,528,573 A | * | 6/1996 | Shim | 369/50 |
| 5,717,679 A | * | 2/1998 | Mashimo et al. | 369/124 |
| 5,926,453 A | * | 7/1999 | Muramatsu et al. | 369/275.3 |
| 6,028,828 A | * | 2/2000 | Maeda | 369/50 |
| 6,088,307 A | * | 7/2000 | Fushimi et al. | 369/50 |
| 6,172,956 B1 | * | 1/2001 | Fuji | 369/44.13 |

* cited by examiner

*Primary Examiner*—Nabil Hindi
(74) *Attorney, Agent, or Firm*—Antonelli, Terry, Stout & Kraus, LLP

(57) ABSTRACT

An optical disc apparatus being able to read and write from and into an optical disc of a wobble groove type or method, a rotation control of a spindle motor is performed including a spindle controller portion and a PWM oscillator generating a clock for use of rotation control, wherein the frequency of the clock for use of rotation control is set to be different from that of a wobble signal or outside an area ±50% of wide capture fluctuation of the wobble signal, thereby providing the optical disc apparatus with which external disturbance on the wobble signal or the like can be reduced and a stabilization of the optical disc apparatus can be obtained.

4 Claims, 6 Drawing Sheets

PHYSICAL ID: 00 ··· PID1
01 ··· PID2
10 ··· PID3
11 ··· PID4

SECTOR TYPE: 000 ··· READ-ONLY SECTOR
100 ··· RAM FIRST SECTOR
101 ··· RAM LAST SECTOR
110 ··· RAM BEFORE SECTOR
110 ··· RAM OTHER SECTOR

OPTICAL DISC APPARATUS WITH DIFFERENT FREQUENCIES OF WOBBLE SIGNAL AND CLOCK SIGNAL FOR ROTATION CONTROL

BACKGROUND OF THE INVENTION

1. Field of the Invention

The present invention relates to an optical disc apparatus for reading and writing data from and onto an optical disc on which a guide groove is formed wobblingly and provided with address information being modified around a predetermined frequency in advance, and in particular, relates to an optical disc apparatus which controls a spindle motor by detecting a wobble signal obtained from the above address information, and a spindle motor controller apparatus thereof.

2. Description of Prior Art

Conventionally, for a purpose of recording data upon an optical disc with high accuracy by an optical disc apparatus, a spindle motor is controlled in the revolution number and the phase thereof. On the surface of the optical disc being developed for the purpose of simplification of the control of the spindle motor, address information being modified around a predetermined frequency is provided in advance on a guide groove which is formed wobblingly, i.e., with a so-called wobbling groove method. With this optical disc, there is no necessity of providing a so-called ID pits on it, therefore the guide groove is continuous. The optical disc apparatus detects a wobble signal from this guide groove so as to acknowledge the address information, and also detects the frequency and the phase of the wobble signal, thereby performing a PLL control of the spindle motor so as to obtain the frequency at a desired one.

Also, when controlling the revolution or rotation of the above-mentioned spindle motor, it is controlled by generating a clock signal for use of rotation control by means of an oscillator of PWM (a pulse wave modulation).

The clock frequency is determined at the upper limit by a frequency band of the controller circuit and at the lower limit by control characteristic of revolution number, for example, approximately 100 KHZ. If the frequency band is set in the high frequency side, noise signal is generated on the reproducing signal since the clock frequency is in a vicinity of the frequency band of the controller circuit.

According to this conventional art, since the guide groove being provided on the optical disc is continuous, detection of the wobble signal is possible under the condition that the revolution number of the spindle motor cannot be identified, as well as the PLL control of the spindle motor. It is of course, but in a case where no wobble signal can obtained, the recording cannot be obtained because of ambiguity of the address.

Further, at the present, an optical disc is proposed for the purpose of high density thereof, which is different from the format mentioned above. On this optical disc, there are provided a guide groove wobbling at a predetermined frequency and an ID pit indicating an ID of a sector, which is positioned at a cutting portion of the guide groove. The wobble signal obtained from this optical disc, since it is detected from the very small or minute wobbling guide groove, although it is determined at a constant or predetermined value, is small in the amplitude. Therefore, it is extracted or sampled by means of a low-pass filter to be amplified thereafter.

On a while, the clock signal for rotation control, which is outputted from the above PMW oscillator is used as the rotation control signal for the spindle motor, and it is large enough in the amplitude of current, therefore there is a problem that it generates noises therefrom. In particular, in a case where the frequency of the clock for rotation control which is outputted from the above PWM oscillator is set a frequency in the vicinity of an area of wide capture fluctuation of the wobble signal, it gives a harmful or ill influence upon the detection of the small or minute wobble signal, thereby generating a beat on the wobble signal, i.e., there occur difficulties in a preferable detection of the wobble signal as well as in an operation control of the spindle motor being controlled thereby.

SUMMARY OF THE INVENTION

Accordingly, an object of the present invention is to provide an optical disc apparatus, with which an external disturbance upon the wobble signal or the like can be reduced, thereby achieving a stabilization of the disc apparatus.

According to the present invention, for achieving the object mentioned above, there is provided an optical disc apparatus for recording into or reproducing from an optical disc, on which a guide groove wobbling at a predetermined frequency and ID pits indicating IDS of sectors at cutting portions of said guide groove are provided, comprising:

a driver motor for rotating said optical disc;

a signal extracting circuit for extracting a control information from said wobbling guide groove;

a wobble detection circuit for extracting a wobble signal from the control information extracted by said signal extracting circuit;

a driver motor controller circuit for controlling rotation number of said driver motor; and a clock oscillator circuit for outputting a clock for use of rotation control of said driver motor, wherein a frequency of said clock for use of rotation control is set at a frequency to be different from the frequency of said wobble signal.

Preferably, according to the present invention, there is provided the optical disc apparatus as described in the above, wherein said clock oscillator circuit is a pulse wave modulation oscillator, and the frequency of the clock for use of rotation control is set outside the frequencies in an area of wide capture fluctuation of the wobble signal.

Further preferably, according to the present invention, there is provided the optical disc apparatus as described in the above, wherein the area of wide capture fluctuation is in ±50% of the frequency of the wobble signal. Further, wherein the frequency of the clock for use of rotation control is set to be higher than the frequency of the wobble signal.

BRIEF DESCRIPTION OF DRAWING(S)

DETAILED DESCRIPTION OF PREFERRED EMBODIMENT(S)

Hereinafter, embodiments relating to an optical disc apparatus and a spindle motor controller apparatus, according to the present invention, will be fully explained by referring to the attached FIGS. 1 to 8.

Figure 1:
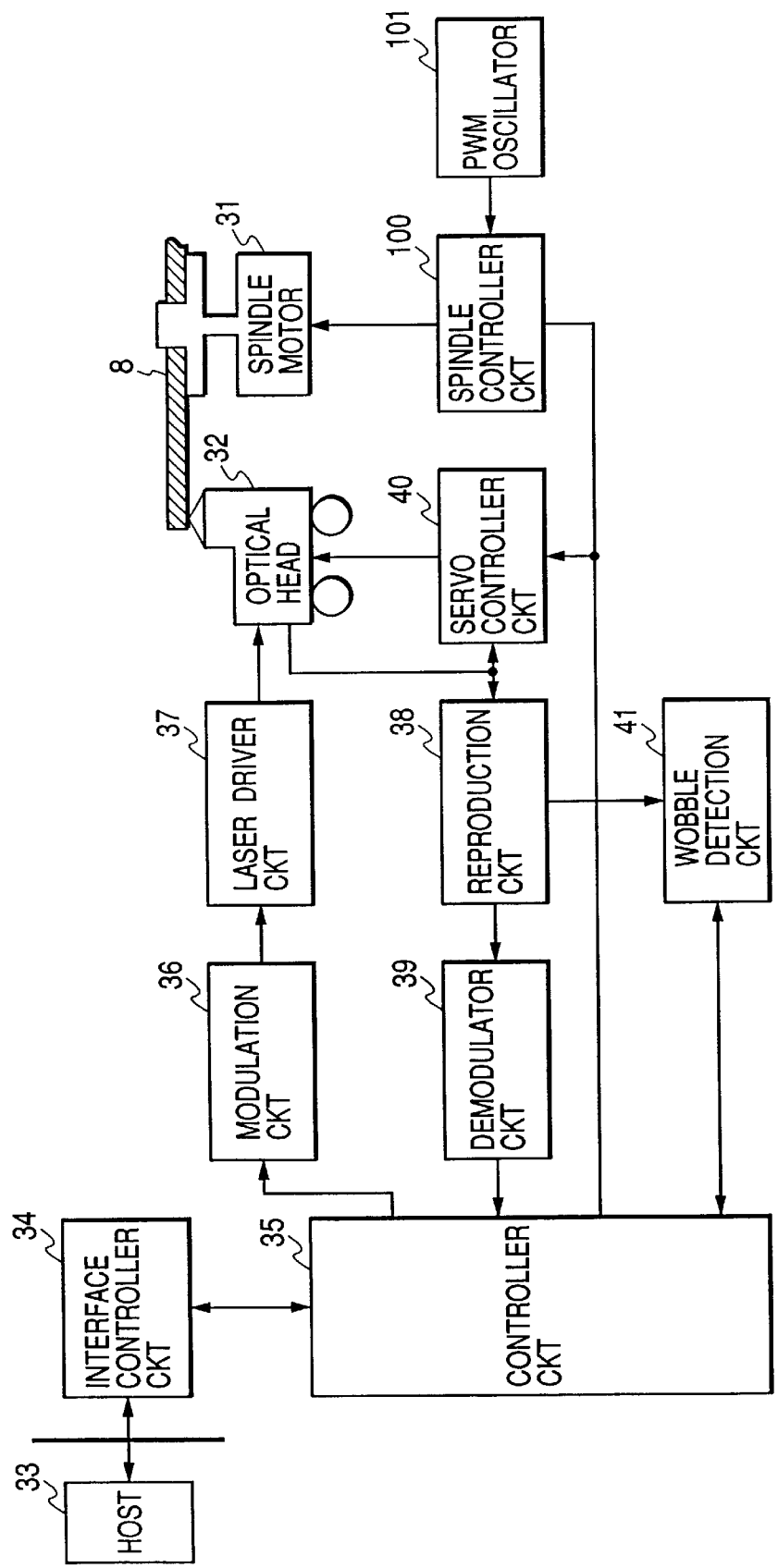
FIG. 1 is a block diagram of showing an embodiment of an optical disc apparatus according to the present invention.

First, by referring with FIG. 1, the construction of the optical disc apparatus according to an embodiment of the present invention will be explained. FIG. 1 is a block diagram of showing an example of an information processing apparatus.

In FIG. 1, a recording medium 8 is one of those of so-called a wobble groove method (i.e., wobbling minutely in the radial direction), on which an address information being modulated around a predetermined frequency is provided in advance on a wobbling guide groove, such as a DVD-RAM adopting a recording layer of phase-change type (GeSbTe). The recording medium 8 is rotatable, being held with a spindle motor 31 which is controlled in the rotation thereof through a spindle controller portion 100. An optical head 32 is constructed with: a semiconductor laser which emits a laser light for recording and reproducing of information; an optical system for forming a light spot of approximately 1 micron on the disc surface, from the light emitted by the semiconductor laser, as well as an optical detector, etc., for obtaining electric signals necessary for achieving recording/reproducing; an auto-focus control; a tracking control; and a spindle motor control, with use of a reflection light from the recording medium 8. Namely, the information can be recorded onto the recording medium 8, such as an optical disc by the optical head 32, or can be reproduced from the recording medium 8. Further, the optical head 32 has a linear motor (not shown in the figure) for moving itself in a radial direction of the disc with high velocity and for stopping it in a vicinity of a position designated.

According to this embodiment, a command or an information data from a host is interpreted with an interface controller circuit 34, while the recording/reproducing and seek operations of the information being executed through a controller circuit 35, and a recording data is recorded on the recording medium 8 by the optical head through a modulator circuit 36 and a laser driver circuit 37. Also, various kinds of signals being read through the optical head 32 are de-modulated back to original data through a reproduction circuit 38 and a de-modulator circuit 39, and the de-modulated data led to the controller circuit 35 can be transferred from the interface controller circuit 34 to the host 33 responding to a reproduction command from the host 33.

Further, during the recording/reproducing operation mentioned above, various kinds of control information which are recorded on the above recording medium 8 are generated with the reproduction circuit 38 mentioned above to be used as the control signals for the various devices. For instance, a wobble signal is generated by a wobble detector circuit 41 so as to control the spindle motor 31 therewith. Other than this, the above control signals are supplied to a servo controller circuit 40 so as to move the above optical head 32 into the radial direction of the recording medium 8 with high velocity through the above-mentioned linear motor. Moreover, the above control signals are also applied to the auto-focus control for the optical head 32 not shown in the figure.

In particular, the present embodiment lies in that the wobble signal provided on the above recording medium 8 is detected through the above wobble detector circuit 41, so as to achieve a rotation control of the spindle motor 31 with high efficiency and stability through the above spindle controller portion 100. And also with the provision of the spindle controller portion 100, in the present embodiment, by separating the clock frequency for use of rotation control of a PWM (pulse wave modulation) oscillator 101 for controlling the above spindle motor 31 from the frequency of the wobble signal, an external disturbance upon the wobble signal or the like can be reduced, thereby obtaining stabilization of the disc apparatus.

Namely, since the number of the wobble for one round is determined, by counting the number for one round, also the above recording medium 8 can control the revolution number. If the revolution number is shifted, by extracting the clock which is determined with the wobble, the clock necessary for reading and writing can be determined, for example to which extent must be read out by a basic clock. When reading, even under a condition where the revolution number is shifted a little bit, so-called a wide capture, the reading can be executed upon the basis of the clock of the wobble.

However, a pulse being outputted from the above PMW oscillator 101 which supplies a pulse current to the spindle motor 31 is large in the amplitude of current since it performs the rotation control on the spindle motor 31, therefore there is a possibility of giving a harmful or ill influence upon the detection of the wobble signal being detected from the minute wobble. In particular, when the frequency of the clock for use of rotation control which is outputted from the above PMW oscillator is set in the vicinity of the wide capture fluctuation area of the wobble signal, then the pulse gives the harmful influence upon the detection of the small minute wobble signal, thereby generating a beat on the wobble signal, i.e., there occur difficulties in a preferable detection of the wobble signal as well as in an operation control of the spindle motor being controlled thereby. Then, according to the present embodiment, the frequency of the clock for use of rotation control which is outputted from the PWM oscillator 101 is set outside the wide capture fluctuation area (±50%) of the above wobble signal. This will be further explained by referring to FIG. 2.

Figure 2:
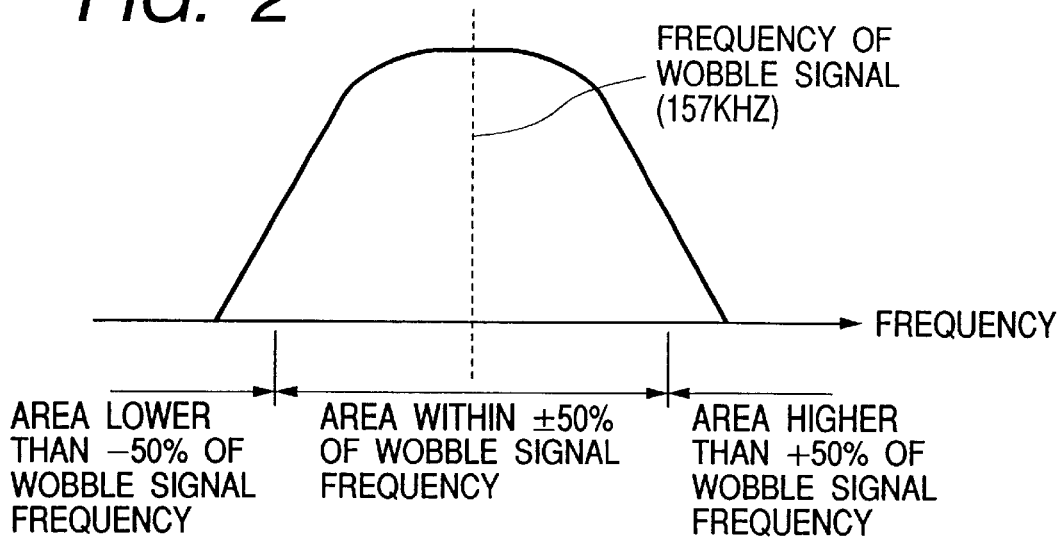
FIG. 2 shows a wave-form of a wobble signal in the embodiment of the optical disc apparatus according to the present invention.

FIG. 2 shows a wave-form of the wobble signal. This wobble signal, as mentioned previously, is determined in the number for one round of the disc, therefore a frequency on the basis thereof is also a predetermined constant value. In more detail, it is 157 KHz. Namely, if the clock for use of rotation control is generated from the PWM oscillator 101 at the frequency outside this 157 KHz, the problem mentioned in the above can be dissolved.

In this optical disc apparatus, the reproducing operation is initiated with use of the wide capture fluctuation before the revolution number reaches to a predetermined revolution number, so as to shorten the time for accessing. Therefore, fluctuation in frequency occurs into the wobble signal corresponding to the wide capture fluctuation range, and also is caused detection error in the optical head 32. For dissolving such the problem, according to the present invention, the frequency of the clock for use of rotation control is selected to be less than −50% of the frequency of the wobble signal, or to be greater than +50% thereof, i.e., beyond the wide capture fluctuation of the wobble signal (i.e., ±50% of the frequency of the wobble signal). Preferably, as will be mentioned later, since the output signals for the auto-focus control and the tracking control occupy the area being low in the frequency, the beat on the wobble signal can be suppressed for increasing the quality of the signal, by making the PWM oscillator 105 output the above clock for use of rotation control at the frequency in the area higher than the plus 50%, i.e., as 1.5 times higher as the frequency (157 KHz) of the wobble signal.

Figure 3:
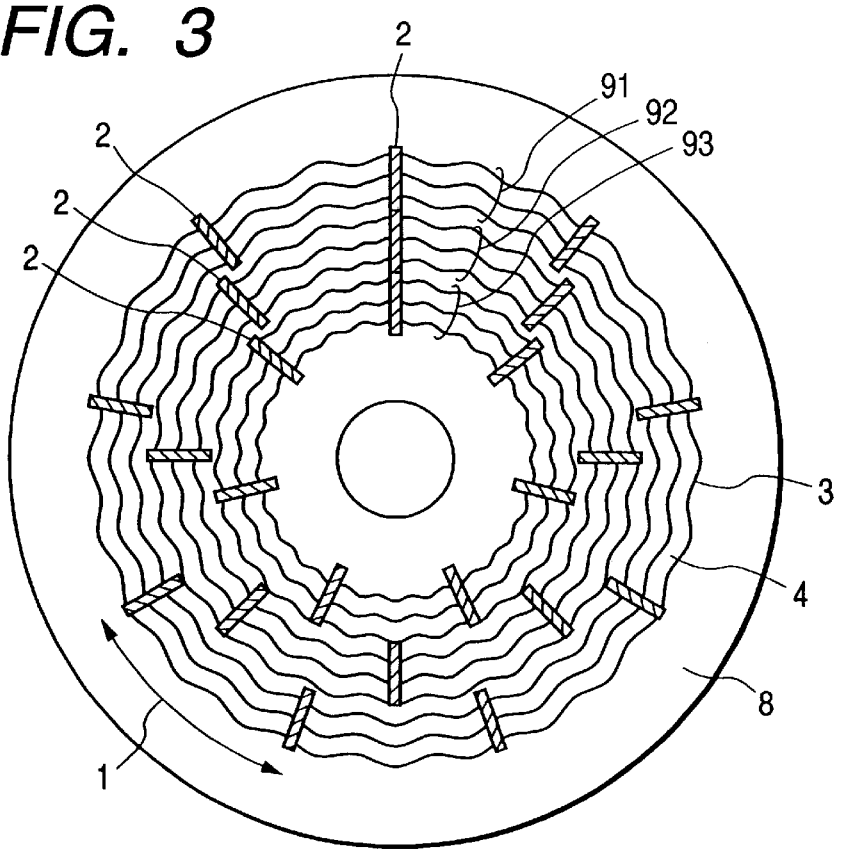
FIG. 3 is a plane view of showing the arrangements of tracks and sectors of a recording medium which is used in the present invention.

Next, by referring to FIGS. 3 to 7, the further details of the above recording medium 8 and the wobble signal being obtainable therefrom will be explained. FIG. 3 is a plain view of showing the arrangements of the tracks and the sectors of the recording medium which is used in the present invention, FIG. 4 a plain view of showing the detailed arrangements of the tracks and sectors of the recording medium, FIG. 5 a chart of giving a number on (or numbering) an identification (ID) information of the recording medium, FIG. 6 a diagram of showing the contents of the ID information, of each header thereof, and of a physical identification (ID) information, and FIG. 7 a block diagram of showing an embodiment of the wobble signal detector circuit.

First of all, by referring to FIG. 3, an explanation will be given on the arrangements of the tracks and the sectors of the recording medium 8 which is used in the present embodiment. In FIG. 3, the reference numeral 8 indicates or denotes the recording medium. A reference numeral 1 indicates the sector each of which is divided by a unit of recording, and the sector 1 is constructed with an identification (ID) portion 2, and a track 3 defined on the groove (called by "on-groove track" hereinafter) or a track 4 defined between the grooves (called by "inter-groove track"), wherein the ID portion 2 is positioned or arranged at the top or tip portion of the sector 1. Since a group is constructed with a plurality of the on-groove tracks 3 and the inter-groove tracks 4 between the grooves which are arranged in the radial direction of the disc-like recording medium 8, then a plurality of groups 91, 92 and 93 are arranged in the radial direction of the recording medium 8. Namely, in FIG. 1, the group 91 is constructed with the on-groove tracks 3 and the inter-groove tracks 4, both of which are formed circulating around. In each one of those groups 91, 92 and 93, the ID portions 2 of the on-groove tracks 3 and the inter-grove tracks 4 are aligned in the radial direction. The on-groove tracks 3 are wobbled with a very small amount in the radial direction. The length of the sector 1 is determined to be almost constant irrespective of the groups.

Next, an explanation will be given on the example of the arrangement of the tracks and the sectors of the recording medium, in more detail, by referring to FIG. 3. The on-groove track 3 having a track width of 0.7 μm and a depth of 60 nm and the inter-groove track 4 having the track width of 0.7 μm are arranged or positioned alternatively. The on-groove track 3 and the inter-grove tracks 4 are connected to each other at a track changeover or exchanging portion 5 from on-groove to inter-groove (hereinafter, called by only "exchanging portion 5"), at one position for one around. Namely, it i s so constructed that, the on-groove track 3 is connected to the inter-groove track 4 after turning one round on the track, while the inter-groove track 4 is connected to the on-groove track 3 after turning one round on the track. Each of the tracks 3 and 4 is divided into a plurality of arc-like units of recording, each of which is indicated by the sector 1, and the ID portions 2 is provided at the top or tip portion of each information recording unit 1. The ID portions 2 can be divided into the exchanging portion 5 and the non-exchanging (or non-changeover) portion 6, and in the ID portions 2 is recorded an identification (ID) information 2a. The length of the sector 1 is about 8 mm, for example, and it corresponds to a user capacity of 2,048 bites. The on-groove track 3 and the inter-groove track 4 are wobbled by a very little amount in the radial direction, with an amplitude or swing of 20 nm. The period of the wobble is 1/232 of the sector length, and a channel clock period of the recording data is so selected that it comes to be equal to the wobble period when being multiplied with an integer. Thereby, it is possible to generate a clock for generating a recording/reproducing timing from the wobble clock.

Figure 4:
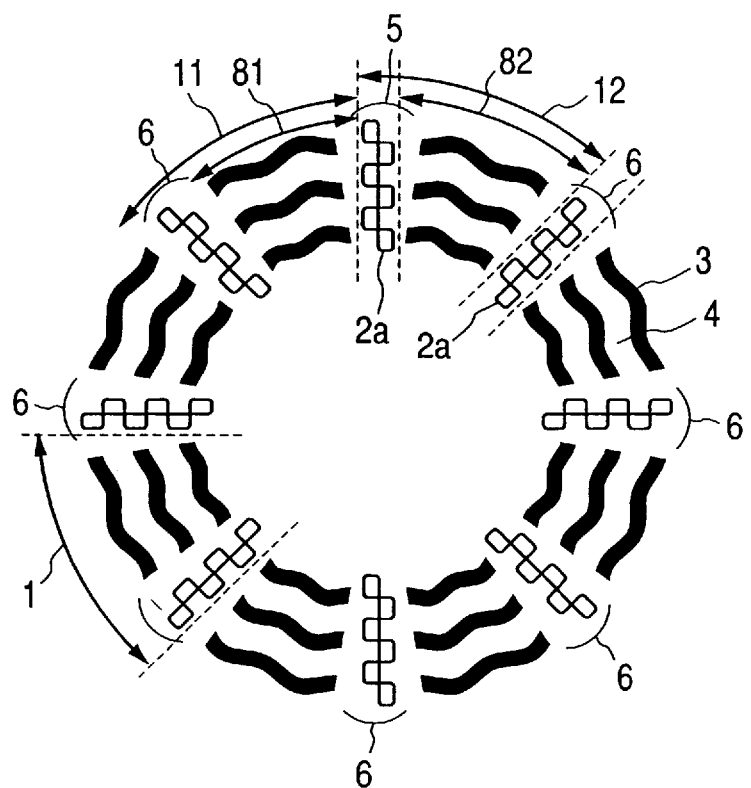
FIG. 4 is a plane view of showing the arrangements of tracks and sectors of a recording medium in details, which is used in the present invention.
Figure 5:
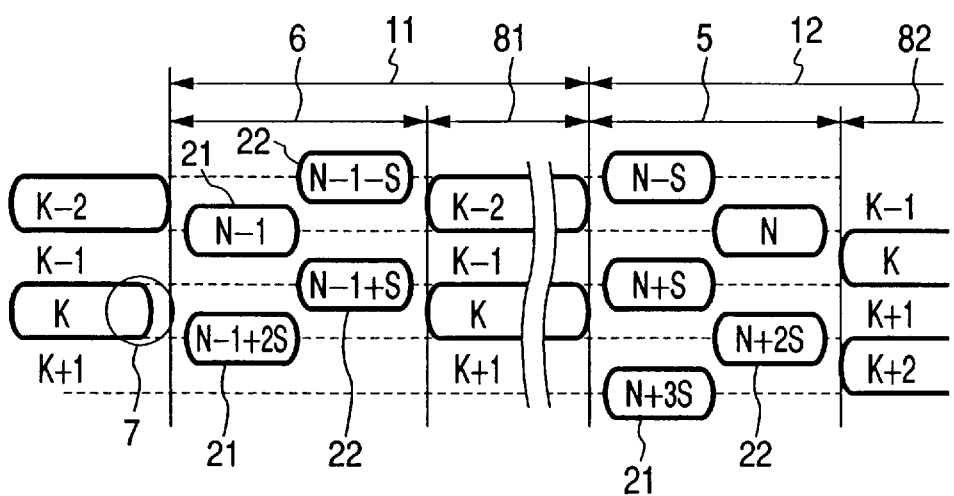
FIG. 5 is a chart of showing an example of numbering of ID information on the recording medium which is used in the present invention.

Still, in FIG. 4, the reference numerals 11 and 12 indicate the sectors before and after the exchanging portion 5, and those will be referred in the explanation on the numbering on the ID information 2a shown in FIG. 5. The sector 11 is constructed with the non-exchanging portion 6, and the on-groove track 3 or the inter-groove track 4, i.e., the recording area or region 81. The sector 12 is constructed with the exchanging portion 5 and the recording area or region 82.

FIG. 5 is a chart view of showing an example of manner of numbering the ID information in the recording medium which is used in the present invention. Hereinafter, by referring to FIGS., an explanation will be given on the manner of numbering of the ID information 2a for identifying or discriminating the on-groove track 3 and the inter-groove track 4.

The identification (ID) information 2a is indicated by reference numerals N−1−S, N−S, N−1 . . . N −1+2S, N+2S, N+3S. Otherwise, the ID information 2a can be divided into a first ID information 21 being located in the right-hand side of the exchanging portion 5 or the non-exchanging portion 6 in FIG. 3 and a second ID information 22 being located in the left-hand side thereof. "K" of the K−2 and K−1 indicates the on-groove track 3 or the inter-groove track 4, and an explanation will be given by assuming that the K−2 and K indicate the on-groove track 3 and the K−1 and K+1 the inter-groove track 4 in this FIG.

And, in this example, the recording/reproducing of the information is performed by relatively scanning a light spot 7 in the direction from the left to the right. The on-groove track K at the left-hand side of the exchanging portion 5 is connected to the inter-groove track K+1 at the right-hand side of the exchanging portion 5. The inter-groove track K+1 at the right-hand side of the exchanging portion 5 is connected to the on-groove track K+2 through the exchanging portion 5 after turning around the track one round. In this example, the first ID information 21 at the non-exchanging portion 6 of the on-groove track K is N−1+2S, and the second ID information 22 is N−1+S. Here, the "S" indicates a sum of units of optical recording information for the one round of the track, i.e., the number of the sectors. When reproducing the ID information 2a on the non-exchanging portion 6 of the on-groove track K by the optical spot 7, N−1+2S is reproduced as the first ID information 21, and N−1+S is reproduced as the second ID information. In this instance, if it is so decided that the number being smaller is always adopted as the recording area number, N−1+S of the second ID information 22 is adopted as the ID information of this on-groove track K. When scanning the inter-groove track K−1, in the same manner, however in this case, N−1 of the first ID information 21 is adopted as the ID information 2a. Accordingly, the distinction between the on-groove track 3 and the inter-groove track 4 can be practiced by depending upon whether the first ID information 21 is adopted or the second ID information is adopted.

When reproducing the on-groove track 3 and the inter-groove track 4 located at the exchanging portion 5, in the totally same manner, the distinction between the on-groove track 3 or the inter-groove track 4 can be practiced. Further, the values of the first ID information 21 and the second ID information 22 differ for each sector 1, and by using thereof, it is possible to detect the position of the each sector 1 on the recording medium 8.

Furthermore, in each of the first ID information 21 and the second ID information 22, there are written information whether this information is located at the exchanging portion 5 or the non-exchanging portion 6 and whether the next coming is the exchanging portion 5 or the non-exchanging portion 6, by three bits. This information is for identifying the exchanging portion 5 or the non-exchanging portion 6, therefore is called as a distinction portion identification (ID) information hereinafter.

Next, an explanation will be given on the ID information in more detail, by referring to FIG. 6.

Figure 6A:
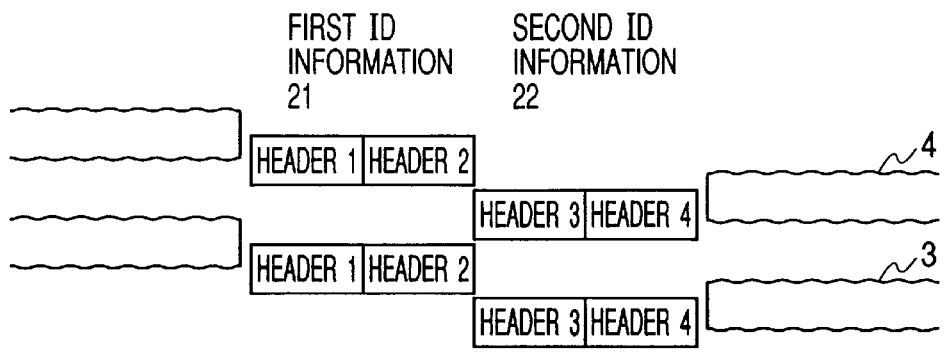
FIG. 6 is a block diagram of showing the contents of an ID information, each header of the ID information, and a physical ID information, which are used in the present invention.

FIGS. 6(a), (b) and (c) are the block drawings of showing the ID information. In those FIGS., the numerals of for example "header 1", "header 2", "PID1", etc., being different from the reference numerals, indicate a first header, a second header and a first PID. For discriminating the "header 1" and "header 2" from the reference numerals, those numerals are indicated within brackets, i.e., (). In the FIGS., the first ID information 21 is constructed with the first header (1) and the second header (2). The second ID information 22 is constructed with the third header (3) and the fourth header (4).

Figure 6B:
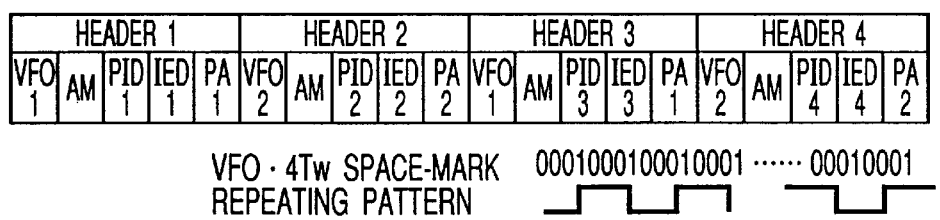

As shown in FIG. 6(b), at the top portions of the first header (1) and the third header (3) are positioned VFO(1)s, and at the top portions of the second header (2) and the fourth header (4) are positioned VFO(2)s. This VFO means a variable frequency oscillator, and is used for the purpose of obtaining the synchronization on a PLL circuit in the reproducing system (not shown in figure). The "AM" which is inserted into the respective headers (1) through (4) in common means an address mark, and is used for the purpose of extracting the information included in the first and second ID informations on the basis thereof. In the headers (1), (2), (3) and (4) are positioned PID (physical identification) (1), PID (2), PID (3) and OID (4), respectively. In this regard, an explanation will be given in more details by referring to FIG, 4(c). Further, in the headers (1)–(4) are positioned IED (1)–(4), respectively. The IED is an abbreviation of ID Erro Detection, i.e., an error detection code for the ID. In the heads (1) and (3) are positioned PAs (1), and in the heads (2) and (4) are positioned PAs (2), respectively. This PA is an abbreviation of Post Amble, and is used for the purpose of suppressing DC reproduction when reproducing each data, so as to make binary coding (converting into binary) thereof easy.

Figure 6C:
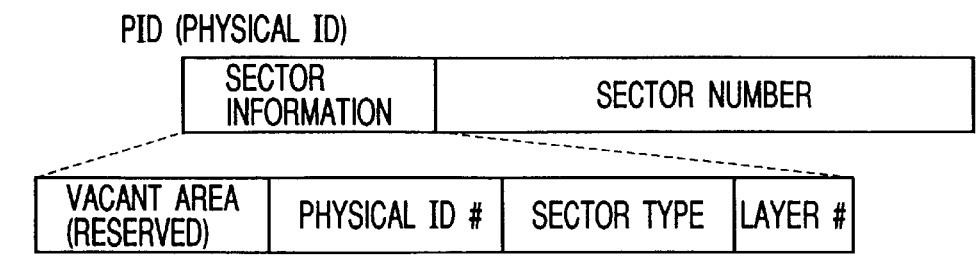

As shown in FIG. 6(c), each PID is constructed with a sector information and a sector number. In the sector information, there are positioned a vacant portion (Reserved), a physical ID# (physical ID number), a sector type, a layer # (layer number). In the physical ID number, there may contained information including a track number, a sector number, etc., wherein the PID (1) is identified by a digital or binary code of (00), the PDI (2) by the digital or binary code of (01), the PDI (3) by (10), and the PDI (4) by (11). In the sector portion, there is included a number of the sectors 1 counting up from the exchanging portion 5. For example, a read-only sector is (000) by the digital or binary code, a RAM first sector indicates a first sector of the RAM, i.e., the sector (100) including the exchanging portion 5, a RAM last sector indicates the last sector (101) of the RAM, a RAM before last sector indicates the last second sector of the RAM by (110), and a RAM other sector indicates other sectors of the RAM by (111).

Next, turning back to FIG. 1, an explanation will be given on an operation of the recording/reproducing with the information processing apparatus according to the present embodiment.

First of al, in the information processing apparatus, the optical disc apparatus is ordinarily connected to the host computer 33, including a personal computer or a workstation, etc., through an interface cable in accordance with a regulation or standard, such as of SCSI (small computer system interface) or ATAPI (at attached packet interface), wherein commands and/or information data from the host 33 is interpreted in the interface controller circuit 34 within the optical disc apparatus, and the recording/ reproducing of the information and the seek operation are executed through the controller circuit 35 which may be constructed with a microcomputer, etc.

First, the recording operation will be explained. The recording data is added with a recording position information (i.e., address information) on the recording medium 8 from the host 33, and a recording command is issued under this condition. After being compiled into a buffer memory (not shown in figure) within the controller circuit 35, this recording data is sent to the modulator circuit 36 in time sequence. In the modulator circuit 36, the recording data is converted into a series of codes corresponding to a run length limit (RLL) code, such as (1,7) RLL code, (2,7) RLL code, or (2,10) RLL code, and is further converted into a pulse train, for example, the pulse train corresponding to a code "1" when recording a mark position, and the pulse train in which the code "1" corresponds to the pulse edge when recording a mark edge. Here, a 8/16 conversion code is used corresponding to the (2,10) RLL code. Namely, such a code conversion is carried out that the 8 bits information is converted into a 16 bits information for writing, and the 16 bits information is converted into the 8 bits information for reading. Those pulse trains are led to the laser driver circuit 37 to turns ON or OFF the semiconductor laser on the optical head 32, thereby emitting a high power pulsated light. This light pulse is converged in the optical head 32 to form a very little or fine spot 7. With this light spot 7, a recording mark is formed in a non-crystal area on the recording medium 8 having the recording layer of the phase change type.

Next, the reproducing operation will be explained. When reproducing, with locating the optical head 32 at the on-groove track 3 and the inter-groove track 4 on the recording medium 8 where is designated by a reproducing command from the host 33, a signal is reproduced from those tracks 3 and 4. First, the output of the semiconductor laser provided on the optical head 32 is turned to be low and to emit DC light on the recording film or layer on the recording medium 8, then a reflection light corresponding to the recording mark can be obtained. The reflection light is received by a photo-detector divided into plural portions thereof within the optical head 32 to be converted from photo to electric, and an electric signal converted is inputted into the reproduction circuit 38. A reproducing signal for reproducing the data can be obtained from a total signal of the photo-detector divided into plural portions, i.e., the sum signal thereof. Also, since the ID information 2a is located in a middle portion between the on-groove track 3 and the inter-groove track 4, an ID signal as the reproduced signal of the ID information 2a can be obtained from a differential signal between the output signals of the photo-detector divided into plural portions. Accordingly, with provision of a signal exchanger circuit within the reproduction circuit 38, the data signal (sum) each of which is detected separately to be turned into binary (or digitized) by only one slice level and the ID signal (difference) are exchanged at a timing which is extracted from the ID information 2a to be a series of the signal. This is composite data signal. This reproduction circuit 38 is constructed with a signal exchanger circuit, an automatic gain controller circuit for maintaining the signal amplitude at a constant, a wave-form equalizing circuit for compensating deterioration in an optical space frequency, a binary circuit (or digitizer), a PLL (phase locked loop) circuit, a discriminator circuit, etc. After being changed into the binary signal through the binary circuit (not shown in figure), the composite signal is discriminated by the discriminator circuit (not shown in figure) to be converted into the discriminated data. Namely, it is converted into a signal in which the phase of the base clock is fitted to the phase of the binary data. The binary data discriminated is inputted into the demodulator circuit 39, wherein the demodulation is carried out on the (1,7) RLL code, the (2,7) RLL code or the (2,10) RLL code so as to demodulate the original data. The demodulated data is led into the controller circuit 35 to be sent to the host 33 through the interface controller circuit 34 corresponding to the reproducing command from the host 33.

With the photo-detector within the above-mentioned optical head 32, an automatic focus controlling signal for controlling the focusing of the light spot 7 onto the recording medium and a tracking signal for performing the tracking control so as to trace a specific on-groove track 3 or the inter-groove track 4 can also be detected other than the reproduced signal. Those automatic focus controlling signal and tracking signal which perform the control of a light point, are inputted into the servo controller circuit 40. The servo controller circuit 40 is constructed with an error signal generator circuit, a phase compensation circuit and a driver circuit, thereby conducting the recording/reproducing of the information by making the optical head 32 trace the specific on-groove track 3 or the inter-groove track 4.

Also, the detection of the wobble signal from a wobble pattern which is positioned within each of the sectors 1 can be achieved from the difference signal between the output signals of the photo-detector divided into the plural portions thereof. For example, for obtaining the wobble signal from the on-groove track 3, diffraction lights of plus and minus primaries (±1 orders) are obtained through a diffraction grating reflected from the reflection light from the light spot 7 irradiated on the on-groove track 3, and they are detected by a photo-electric element having a plurality of divided areas, whereby it can be obtained by the difference between the output signals of the photo-electric element. From those signals obtained in this manner, however, not only the wobble signal but also the tracking control signal can be obtained. The tracking control signal varies within a range of about 1–3 KHz in frequency, and an objective lens of the optical head 32 also changes responding to this range of frequency. On the contrary to this, the wobble signal is set to be much higher than that, for example, at 157 KHz, therefore the tracking will never be controlled by the wobble signal. Accordingly, even if the wobble signal is mixed into the tracking control signal, no influence is effected on the control of the tracking. The wobble signal is obtained by passing the differential signal through a filter.

This aspect is one of the reasons why the frequency of the clock for rotation control of the PWM oscillator 101 according to the present embodiment is selected or set to be equal or higher than 1.5 times of the 157 KHz, as was mentioned previously, i.e., the frequency giving little influence upon the above wobble signal and the above tracking signal.

Next, an explanation will be given on the wobble detection circuit which generates a clock for generating a timing from the wobble signal, by referring to FIG. 7.

Figure 7:
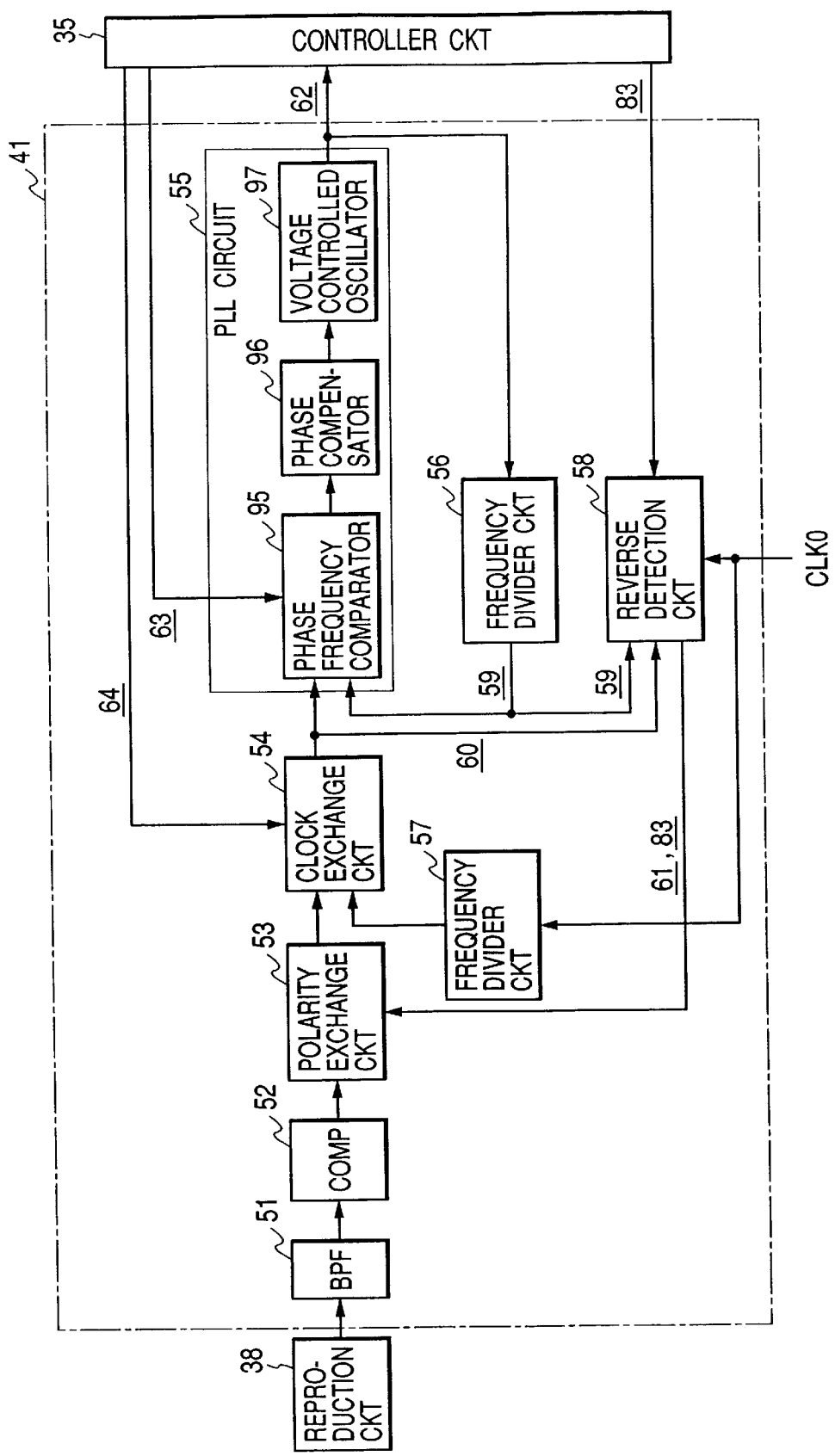
FIG. 7 is a block diagram of showing an embodiment of a wobble signal detector circuit in the optical disc apparatus according to the present invention.

In FIG. 7, a reference numeral 41 is the wobble detection circuit 41, to which are supplied with the wobble signal taken out from the reproduction circuit 38 and the ID signal obtained from the ID information 2a. The ID signal contains the position on the recording medium 8, i.e., the address in the recording medium 8, the information indicative of whether on-groove track or the inter-groove track, and the position information indicative of whether the exchanging portion 5 or the non-exchanging portion 6.

The tracking error signal obtained from the on-groove tack 3 and the tracking error signal obtained from the inter-groove track 4 are reversed in the polarities thereof. As a result of this, the wobble signal is reversed in the phase at the exchanging portion 5.

In FIG. 7, the wobble signal and the ID signal are taken out from the reproduction circuit 38 and are inputted into the wobble detector circuit 41. Since the amount or amplitude of the wobble is so little, such as approximately 20 nm being equal to $\frac{1}{10}$ of the track width, the stable wobble signal can be obtained, with reducing the noises therein and maintaining the amplitude thereof, by use of a band pass filter (BPF) 51 and an amplifier (not shown in figure. However, in a case where the band pass filter 51 is constructed with an active filter, since this filter 51 also functions as the amplifier in common, the amplifier is not necessarily provided). This wobble signal in the analogue condition is turned into the binary (or digitized) by a comparator 52. Since the diffraction light from the light spot 7 varies depending on the positional relationship between the light spot 7 and the on-groove track 4, the wobble signal is reversed in the polarity when passing through the on-groove track 3 and when passing through the inter-groove tack 4. Because of this, the polarity must be changed for each the on-groove track 3 or the inter-groove track 4 by a polarity exchanging circuit 53. There are two means for generating the timing of the exchange. As a first means thereof, it can be detected by discriminating the ID signal (this can be obtained from the ID information 2a on the recording medium) at the exchanging portion 5 locating at one place per every one turn of the track. Namely, from the ID signal obtained from the differential signal among the plural photo-detectors, it can be detected by deciding whether the first ID information 21 is adopted or the second ID information 22 is adopted. In this case, the polarity exchanging signal which is detected by the controller circuit 35, being one of a SL/SG (select land/select groove), is indicated by a signal 83. This first polarity exchanging signal 83 is effective when the optical head 32 begins tracing on the on-groove track 3 or on the inter-groove track 4 so that the normal wobble signal can be obtained, and when the exchanging timing can be detected normally in the controller circuit 35. The details of this first means will be explained by referring to the drawings later.

An explanation will be given on the second means by referring to FIG. 7. In the FIG., the wobble signal and the ID signal are inputted into the band pass filter 51 of the wobble detection circuit 41, and the wobble signal of the analogue condition is taken out from this filter 51. After being compared with a reference signal to be a binary by the compartor 52, this signal is supplied though the polarity exchanging circuit 53 and the clock exchanging circuit 54 to a phase frequency comparator 95 of the PLL circuit 55 as the wobble signal as well as to the reverse detection circuit 58. The wobble signal 60 is outputted as a clock 62 for use in generating a recording/reproduction timing 62 (hereinafter, simply called by a timing generating clock) through the phase frequency comparator 95, a phase compensator 96 and a voltage controlled oscillator 97. The frequency of the wobble signal 60 is, commonly, set to be lower than the timing generating clock 62. In this example, the frequency of the wobble signal 60 is set as $1/186$ small as that of the timing generating clock 62. Because of this, the timing clock 62 is divided into the frequency by a frequency divide circuit 56 to be fed back to the phase frequency compartor 95 of the PLL circuit 55. This feedback signal 59 and the wobble signal 60 are compared with each other in the phase frequency compartor 95, and the voltage controlled oscillator 97 is controlled through the phase compensator 96, whereby the timing generating clock 62 which is fitted to the wobble signal 60 in the phase is outputted from an output terminal of the PLL circuit 55. This timing generating clock 62 is divided in frequency by the frequency divider circuit 56 so that it comes to be same to the wobble signal 60 in the frequency. This signal divide in frequency is supplied to the PLL circuit 55 and to a reverse detection circuit 58 as the feedback signal. When the phase difference between the wobble signal 60 and the feedback signal 59 becomes larger than a predetermined value, the second polarity exchanging signal 61 is generated from the reverse detection circuit 58 to be supplied to the polarity exchanging circuit 53, thereby reversing the wobble signal in the polarity thereof. Ordinarily, the first polarity exchanging signal 83, i.e., the SL/SG from the controller circuit 35, passing through an EOR gate 75 within the reverse detection circuit 58, is supplied to the polarity exchange circuit 53, thereby reversing the wobble signal in the polarity thereof. However, in a case where the bit(s) in the ID portion 2 is collapsed or destroyed or it/they has defect, the first and second ID informations 21 and 22 cannot be reproduced. Therefore, since the first polarity exchange signal 83 is not generated or is generated erroneously, this cannot be used nor applied to. In this instance, the wobble signal 60 is exchanged by use of the second polarity exchange signal 6.

Further, during the rising-up of the optical head and/or the seek operation, the wobble signal 60 cannot be reproduced, therefore it is impossible to keep the timing generating clock 62. In this instance, the base clock CLKO from a basic oscillator (not shown in figure) is divided in frequency by the frequency divider 57 so as to be equal to the frequency of the wobble signal, and is supplied to the clock exchange circuit 54. When the optical head 32 rises up, or during the seeking operation, the clock exchange signal 64 is generated from the controller circuit 35, therefore the base clock which is divided in frequency with this clock exchange signal 64 is supplied to the PLL circuit 55. Accordingly, the PLL circuit 55 operates normally even in the rising-up and/or the seek operation, and as the output thereof is generated the timing generating clock. In this manner, in the time period from when the optical head 32 starts the track tracing up to when the normal wobble signal is obtained, the PLL circuit 55 for use of wobble clock always operates with stability, by inputting the base clock from a quartz oscillator.

Next, an explanation will be given further on the generation of the timing generating clock by the PLL circuit 55. In a case where the frequency of the wobble signal to be detected is set at $1/186$ of the timing generating clock, for example, the wobble signal 60 is too late in the period and small in the phase compare gain, in the phase frequency compartor 95 at an input stage of the PLL circuit 55, thereby bringing about a problem that the pulling time period for reaching to the base frequency becomes long. Also, because the difference in the frequency between the timing generating clock 62 and the wobble signal 60 is large, a problem occurs that it is impossible to adopt such the type of PLL which carries out the pulling of the frequency. Therefore, according to this embodiment, the base clock CLK0 from the quartz oscillator is divided in frequency so as to coincide the input frequency with that of the wobble signal 60, and the clock 62 for use of generating the recording/reproducing timing of the PLL circuit 55 is divided in frequency by the frequency divider 56 to be fed back to the phase frequency comparator 95. Also, no wobble signal is generated in the ID portion 2 since there is no wobble portion therein, then the PLL runs out of control with this condition, therefore the operation of the phase frequency compartor 95 of the PLL circuit 55 is stopped by a PLL hold signal 63 from the controller circuit 35 during the ID portion 2, so as to maintain the oscillation frequency. With this, the frequency of the wobble signal 60 to be inputted comes to be almost equal to that of the feedback signal 59, while the frequency is also kept at a constant in the ID portion 2, thereby obtaining the stable operation of the PLL circuit 55.

When reproducing the data from the recording medium 8 in which it is recorded with a CLV (constant linear velocity) or ZCL (zoned CLV), there may be happened that the effective seek time comes to be long since the reproducing process cannot be executed until the revolution number reaches to a predetermined value, in particular when the revolution number of the spindle motor 31 fluctuates in the seek operation. This problem can be dissolved by the PLL circuit 55 which has the same function to the wide capture reproduction being adopted in the CD-ROM apparatus. In more detail, if the PLL circuit 55 has the function of pulling the frequency, the PLL circuit 55 operates to synchronize with the wobble signal 60 as the input even if the revolution number is shifted out of the steady state, thereby executing the reproducing operation.

If the PLL circuit 55 having such the function of pulling the frequency is adopted, the PLL circuit 55 operates to synchronize with the wobble signal 60 as the input, thereby obtaining the reproducing operation even if the revolution number is shifted out of the steady state. Further, if the PLL circuit being constructed only with a comparator is adopted, the similar effect can be obtained by adding a frequency detector separately, so as to change a VCO (voltage control oscillator) within the PLL circuit in the reproduction circuit 38 into the direction in which the revolution number varies until when it coincides with the frequency, and by executing the synchronization while locking the PLL circuit when it coincides with.

With a type as an another embodiment, in which a signal input of the PLL circuit within the reproduction circuit 38 can be exchanged between the recording/reproducing signal and the base clock with a RDGATE (READ GATE), the VCO frequency of the PLL circuit 55 can be kept to coincide with the wobble frequency always, and also the time period in which the revolution number of the spindle motor 31 enters into an acceptable area can be reduced, therefore the seek time can be shorten.

As in the above, according to the present embodiment, since the timing generating clock can be generated with stability by use of the wobble detector circuit, the recording/reproducing process can be obtained with high reliability but without influence of such the defects and so on. Further, according to the present embodiment, since the quality (i.e., good or bad) of the recording condition of the recording operation can be decided, thereby enabling the information processing with more stability, and with high density and high reliability.

Figure 8:
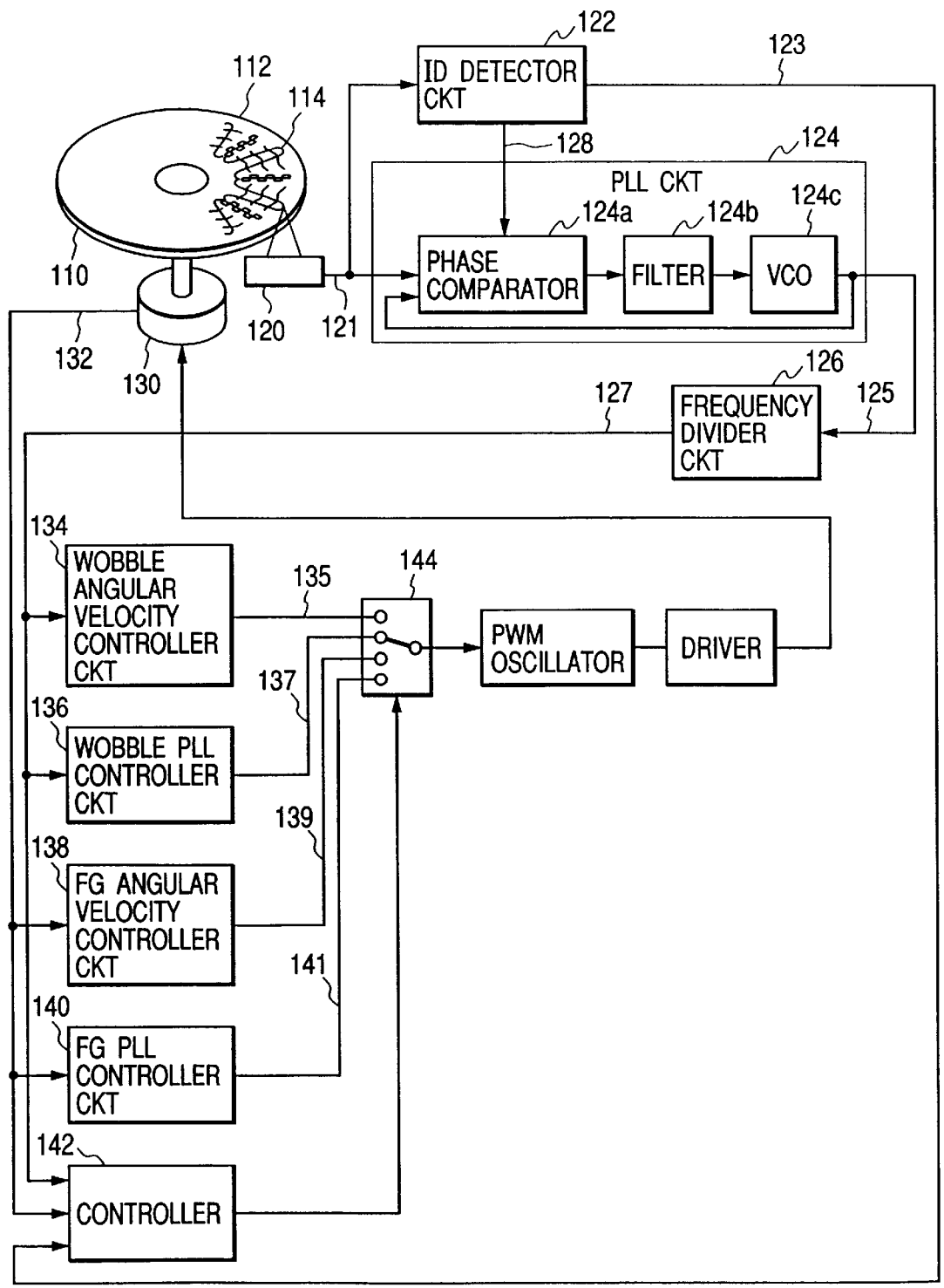
FIG. 8 is a block diagram of showing an another embodiment of the optical disc apparatus according to the present invention.

Next, an explanation will be given on a spindle motor controller apparatus with use of the wobble signal, by referring to an optical disc apparatus shown in FIG. 8 according to other embodiment. However, in the present embodiment, only the elements which relate the spindle motor controller apparatus are shown to be explained, and the other elements or the construction thereof will be omitted from the explanation thereof. The reproduction signal 121 which is reproduced by an optical head 120 is inputted into an ID detector circuit 122 and a PLL circuit 124. The ID detector circuit 122 is provided for reproducing an ID signal 123 from an ID pit 114. While, the PLL circuit 124 is for detecting a wobble signal 125 being synchronized with a guide groove 112, and is constructed with a phase compartor 124a, a filter 124b, and a VCO 124c. The ID detector circuit 122 outputs a hold signal 128 in synchronism with an ID to stop the operation of the phase compartor 124a.

From a spindle motor 130 is outputted a FG signal 132. The FG signal is an output of such as a Hall element. A controller system of the spindle motor is constructed with four controller systems. A first controller system is realized with a wobble angular velocity controller circuit 134 for measuring the frequency of the wobble signal divided in frequency to output the difference from a target value thereof, a second controller system with a wobble PLL controller circuit 136 for measuring the frequency and the phase of the wobble signal divided in frequency to output the sum of the differences from respective target values thereof, a third controller system with a FG angular velocity controller circuit 138 for measuring the frequency of a FG signal to output the difference from a target value thereof, and a fourth controller system with a FGPLL circuit 140 for measuring the frequency and the phase of the FG signal to output the sum of the differences from respective target values thereof. The exchange of control of the spindle motor is performed with a switch 144 on the basis of a command of a controller 142. The controller 142 calculates the revolution number of the spindle motor from the FG signal 132 and a velocity of the optical disc from the wobble signal 127 divided in frequency. Further, the controller system is decided upon the presence of the ID signal 123. The signal which is selected by the switch 144 is inputted into a driver 146, as the clock for use of rotation control which is supplied to the PWM oscillator 145 to have the frequency being higher than 1.5 times of the frequency of the wobble signal, thereby rotating the spindle motor 30 with the driver 146.

In this manner, according to the optical disc apparatus according to the present embodiment, electricity consumption can be reduced by the PWM rotation control with the PWM oscillator, and also the beat generation on the wobble signal caused by adoption of the PWM oscillator can be suppressed as well, by a means or idea on the circuit board, i.e., by differing the frequency of the clock for use of rotation control from the frequency area of the wobble signal.

As is fully explained in the above, according to the present invention, the disc apparatus can be provided, with which the electricity consumption as well as the external disturbance onto the wobble signal or the like can be reduced, thereby obtaining the stabilization thereof.

What is claimed is:

1. An optical disc apparatus for recording into or reproducing from an optical disc, on which a guide groove wobbling at a predetermined frequency is provided, comprising:

a driver motor for rotating said optical disc;

a signal extracting circuit for extracting a control information from said wobbling guide groove;

a wobble detection circuit for extracting a wobble signal from the control information extracted by said signal extracting circuit;

a driver motor controller circuit for controlling rotation number of said driver motor; and a clock oscillator circuit for outputting a clock for use of rotation control of said driver motor, wherein a frequency of said clock for use of rotation control is set at a frequency sufficiently different from the frequency of said wobble signal; and wherein said clock oscillator circuit is a pulse wave modulation oscillator, and the frequency of the clock for use of rotation control is set outside the frequencies in an area of wide capture fluctuation of the wobble signal.

2. An optical disc apparatus as described in the claim 1, wherein the area of wide capture fluctuation is in ±50% of the frequency of the wobble signal.

3. An optical disc apparatus as described in claim 1 or 2, wherein the frequency of the clock for use of rotation control is set to be higher than the frequency of the wobble signal.

4. An optical disc apparatus as described in claim 1 or 2, wherein the guide groove is provided with ID pits indicating IDs of sectors at cutting portions of the guide groove.

* * * * *